US012663554B2

(12) United States Patent
Dellinger et al.

(10) Patent No.: US 12,663,554 B2
(45) Date of Patent: Jun. 23, 2026

(54) SYSTEMS AND METHODS OF PERFORMING VELOCITY SURVEYS USING SPACED SOURCE ACTIVATION LINES

(71) Applicant: BP Corporation North America Inc., Houston, TX (US)

(72) Inventors: Joseph Anthony Dellinger, Houston, TX (US); Esteban Diaz Pantin, Houston, TX (US); Hu Jin, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 72 days.

(21) Appl. No.: 17/384,490

(22) Filed: Jul. 23, 2021

(65) Prior Publication Data

US 2022/0026595 A1 Jan. 27, 2022

Related U.S. Application Data

(60) Provisional application No. 63/055,447, filed on Jul. 23, 2020.

(51) Int. Cl.
*G01V 1/38* (2006.01)
*G01V 1/28* (2006.01)
(Continued)

(52) U.S. Cl.
CPC ............ *G01V 1/3843* (2013.01); *G01V 1/282* (2013.01); *G01V 1/36* (2013.01); *G01V 1/364* (2013.01);
(Continued)

(58) Field of Classification Search
None
See application file for complete search history.

(56) References Cited

U.S. PATENT DOCUMENTS 9,964,656 B2 * 5/2018 Orji ......................... G01V 1/364
10,156,651 B2 * 12/2018 Söllner .................. G01V 1/364
(Continued)

FOREIGN PATENT DOCUMENTS

CN 108445533 B 6/2019
WO WO-2021142064 A1 * 7/2021

OTHER PUBLICATIONS

Manin Michel et al: "Full-azimuth, full-offset, high fidelity vector marine seismic acquisition", The Leading Edge, vol. 39, No. 4, Apr. 1, 2020, pp. 238-247, XP055851361.
(Continued)

*Primary Examiner* — Arleen M Vazquez
*Assistant Examiner* — Leonard S Liang
(74) *Attorney, Agent, or Firm* — Conley Rose, P.C.

(57) ABSTRACT

A method for performing a seismic survey of an earthen subterranean formation includes deploying a node patch including a plurality of seismic receivers to an offshore seabed in a survey area, deploying a surface vessel towing an array of seismic sources to the survey area located, and activating the array of seismic sources to generate seismic waves as the array of seismic sources are transported in an inline direction through the survey area whereby an imaging activation pattern and a velocity activation pattern are formed, wherein a lateral offset between the velocity activation pattern and the node patch is greater than a lateral offset between the imaging activation pattern and the node patch.

19 Claims, 7 Drawing Sheets

(51) Int. Cl.

| | |
|---|---|
| *G01V 1/36* | (2006.01) |
| *G01V 1/00* | (2024.01) |
| *G01V 1/30* | (2006.01) |

(52) U.S. Cl.

CPC .......... *G01V 1/3808* (2013.01); *G01V 1/3852* (2013.01); *G01V 1/006* (2013.01); *G01V 1/28* (2013.01); *G01V 1/30* (2013.01); *G01V 1/301* (2013.01); *G01V 1/303* (2013.01); *G01V 1/38* (2013.01); *G01V 1/3835* (2013.01); *G01V 2210/1212* (2013.01); *G01V 2210/59* (2013.01); *G01V 2210/6222* (2013.01); *G01V 2210/74* (2013.01)

(56) References Cited

U.S. PATENT DOCUMENTS

| | | | | |
|---|---|---|---|---|
| 10,393,901 | B2 * | 8/2019 | Lu ............................ | G01V 1/36 |
| 2013/0322212 | A1 * | 12/2013 | Pica ........................ | G01V 1/303 |
| | | | | 367/38 |
| 2014/0119157 | A1 * | 5/2014 | Whitmore, Jr. ........ | G01V 1/362 |
| | | | | 367/7 |
| 2015/0057938 | A1 * | 2/2015 | Krohn .................... | G01V 1/005 |
| | | | | 702/18 |
| 2015/0063064 | A1 * | 3/2015 | van Groenestjin .... | G01V 1/362 |
| | | | | 367/21 |
| 2015/0204991 | A1 * | 7/2015 | Abma .................... | G01V 1/003 |
| | | | | 367/7 |
| 2015/0272506 | A1 * | 10/2015 | Childs ..................... | G01V 3/38 |
| | | | | 702/189 |
| 2015/0346368 | A1 * | 12/2015 | Dellinger ............... | G01V 1/345 |
| | | | | 367/7 |
| 2016/0097870 | A1 * | 4/2016 | Routh .................... | G01V 1/282 |
| | | | | 703/2 |
| 2016/0109595 | A1 | 4/2016 | Stork | |
| 2016/0187514 | A1 * | 6/2016 | Dellinger ............. | G01V 1/3808 |
| | | | | 367/24 |
| 2016/0202379 | A1 * | 7/2016 | Sallas .................. | G01V 1/3808 |
| | | | | 367/21 |
| 2017/0176613 | A1 * | 6/2017 | Burnett .................. | G01V 1/282 |
| 2017/0363757 | A1 * | 12/2017 | Halliday ................ | G01V 1/282 |
| 2018/0259666 | A1 * | 9/2018 | Siliqi ................... | G01V 1/3808 |
| 2018/0335537 | A1 * | 11/2018 | Goujon ................... | G01V 1/36 |
| 2019/0064380 | A1 | 2/2019 | Sharma | |
| 2019/0243017 | A1 * | 8/2019 | Klinger ................. | G01V 1/301 |
| 2023/0022264 | A1 * | 1/2023 | Moldoveanu ........... | G01V 1/42 |
| 2023/0121269 | A1 * | 4/2023 | Kumar ................. | G01V 1/3808 |
| | | | | 367/21 |

OTHER PUBLICATIONS

International Search Report and Written opinion dated Oct. 25, 2021, for Application No. PCT/US2021/043039.

* cited by examiner

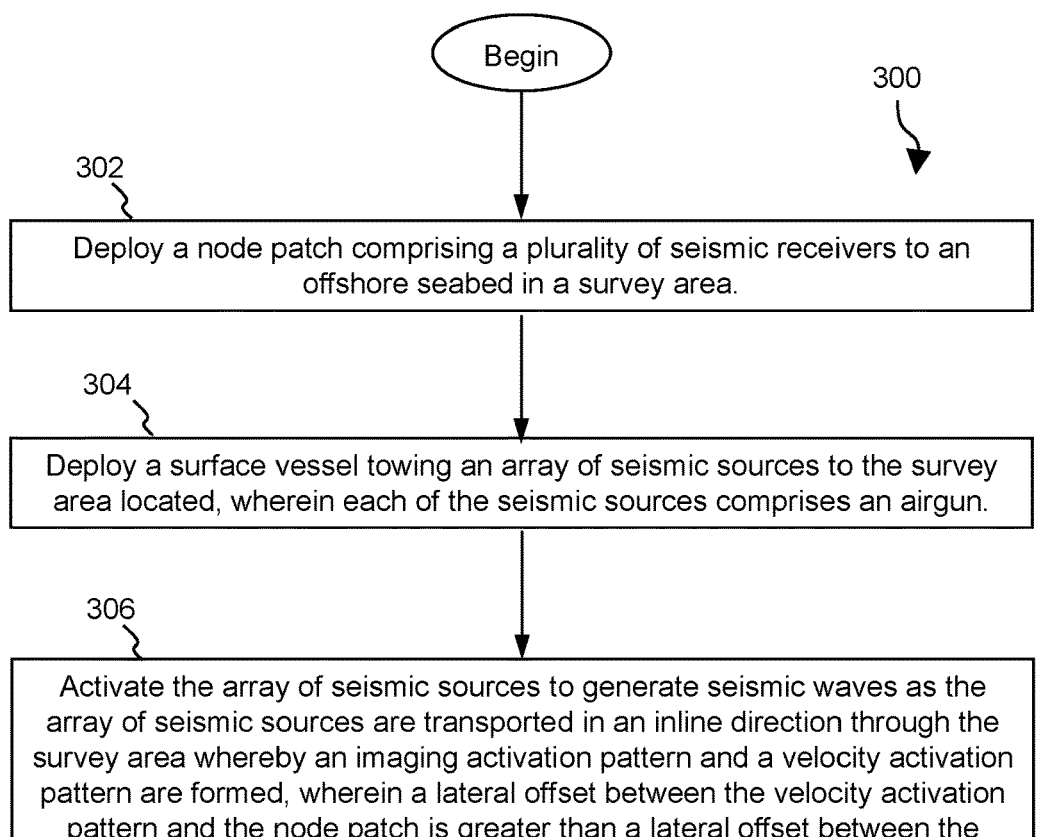

Begin

300

302

Deploy a node patch comprising a plurality of seismic receivers to an offshore seabed in a survey area.

304

Deploy a surface vessel towing an array of seismic sources to the survey area located, wherein each of the seismic sources comprises an airgun.

306

Activate the array of seismic sources to generate seismic waves as the array of seismic sources are transported in an inline direction through the survey area whereby an imaging activation pattern and a velocity activation pattern are formed, wherein a lateral offset between the velocity activation pattern and the node patch is greater than a lateral offset between the imaging activation pattern and the node patch, wherein the velocity activation pattern comprises a plurality of separate velocity activation lines separated by gaps.

End

FIG. 7

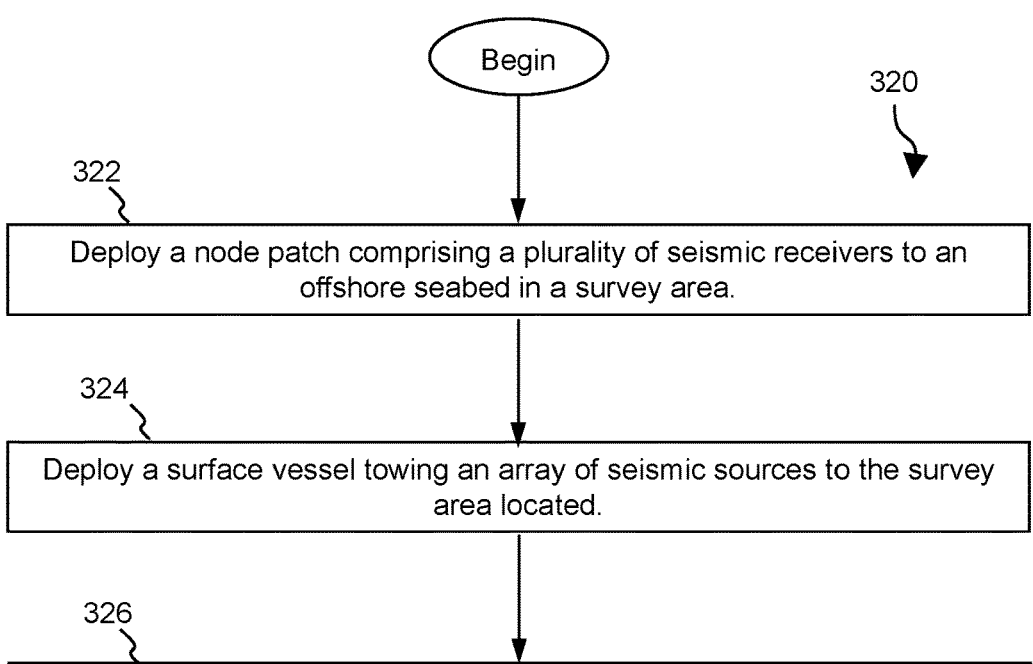

322

Deploy a node patch comprising a plurality of seismic receivers to an offshore seabed in a survey area.

324

Deploy a surface vessel towing an array of seismic sources to the survey area located.

326

Activate the array of seismic sources to generate seismic waves as the array of seismic sources are transported in an inline direction through the survey area whereby an imaging activation pattern and a velocity activation pattern are formed, wherein a lateral offset between the velocity activation pattern and the node patch is greater than a lateral offset between the imaging activation pattern and the node patch, wherein the velocity activation pattern comprises a plurality of separate velocity activation lines separated by gaps, and wherein each of the plurality of velocity activation lines has a minimum width in a crossline direction, orthogonal the inline direction, of at least 400 meters.

320

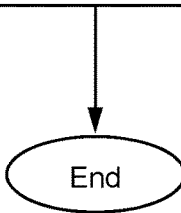

FIG. 8

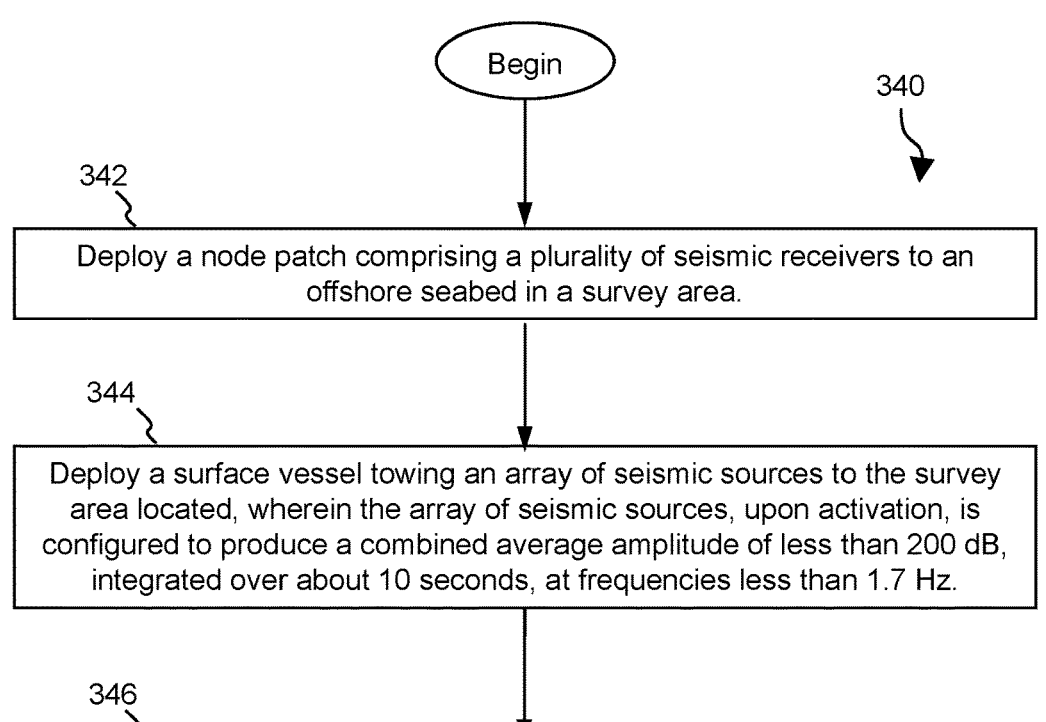

340

342

Deploy a node patch comprising a plurality of seismic receivers to an offshore seabed in a survey area.

344

Deploy a surface vessel towing an array of seismic sources to the survey area located, wherein the array of seismic sources, upon activation, is configured to produce a combined average amplitude of less than 200 dB, integrated over about 10 seconds, at frequencies less than 1.7 Hz.

346

Activate the array of seismic sources to generate seismic waves as the array of seismic sources are transported in an inline direction through the survey area whereby an imaging activation pattern and a velocity activation pattern are formed, wherein a lateral offset between the velocity activation pattern and the node patch is greater than a lateral offset between the imaging activation pattern and the node patch, wherein the velocity activation pattern comprises a plurality of separate velocity activation lines separated by gaps.

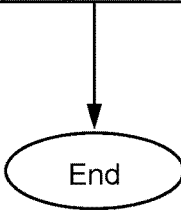

FIG. 9

SYSTEMS AND METHODS OF PERFORMING VELOCITY SURVEYS USING SPACED SOURCE ACTIVATION LINES

CROSS-REFERENCE TO RELATED APPLICATIONS

This application claims benefit of U.S. provisional patent application Ser. No. 63/055,447 filed Jul. 23, 2020, and entitled "Methods and Apparatus for Implementing Widely-Spaced Fat Source Lines for Efficient Velocity Surveys," which is hereby incorporated herein by reference in its entirety for all purposes.

STATEMENT REGARDING FEDERALLY SPONSORED RESEARCH OR DEVELOPMENT

Not applicable.

BACKGROUND

Seismic surveying is a method of exploration geophysics in which seismology is used to estimate properties of earthen subterranean formations from reflected seismic waves. Seismic surveying generally includes imparting acoustic or sound waves into a natural environment so that the wavers enter the Earth and travel through a subterranean formation of interest. As the seismic waves encounter an interface between two materials of the subterranean formation, some of the wave energy is reflected off of the interface where the reflected wave energy may be recorded at the surface, while some of the wave energy refracts through the interface and penetrates deeper into the subterranean formation. The reflected wave energy recorded at the surface may be studied to ascertain information about the subterranean formation. For example, the recorded wave energy may be used to construct an image of the subterranean formation. Properly focusing the image and placing its features at their true locations within the Earth typically requires an understanding of the subsurface velocity structure between the surface and the subterranean formation of interest. In at least some applications, "diving waves" are used to help build an accurate model of the velocity structure above the subterranean formation of interest. Diving waves generally travel downwards, then move horizontally through the Earth before returning to the surface.

Additionally, one type of seismic survey is a "marine" seismic survey in which one or more seismic sources may be positioned within or on the waterline of a column of water (e.g. a sea, a lake, a bay, a tidal swamp, etc.). The one or more seismic sources may be activated to generate seismic waves which travel through a seabed positioned beneath the column of water and into and through a subterranean formation extending below the seabed which may include hydrocarbon deposits. At least some of the wave energy of the seismic waves may return towards the seabed after interacting with features of the subterranean formation and/or a portion of the earth located between the subterranean formation of interest and the seabed. The returned wave energy may be captured by nodes positioned at or above the seabed.

SUMMARY

An embodiment of a method for performing a seismic survey of an earthen subterranean formation comprises (a) deploying a node patch comprising a plurality of seismic receivers to an offshore seabed in a survey area, (b) deploying a surface vessel towing an array of seismic sources to the survey area located, and (c) activating the array of seismic sources to generate seismic waves as the array of seismic sources are transported in an inline direction through the survey area whereby an imaging activation pattern and a velocity activation pattern are formed, wherein a lateral offset between the velocity activation pattern and the node patch is greater than a lateral offset between the imaging activation pattern and the node patch, wherein the velocity activation pattern comprises a plurality of separate velocity activation lines separated by gaps, and wherein each of the plurality of velocity activation lines has a minimum width in a crossline direction, orthogonal to the inline direction, of at least 400 meters. In some embodiments, each of the plurality of velocity activation lines has a minimum width in a crossline direction, orthogonal to the inline direction, of at least 500 meters. In some embodiments, a ratio of an average crossline width of the plurality of velocity activation lines to an average crossline width of the plurality of gaps is between 0.10 and 0.40. In certain embodiments, each of the seismic sources comprises a seismic airgun. In certain embodiments, an activation density of each of the plurality of velocity activation lines is greater than an activation density of the imaging activation pattern. In some embodiments, the array of seismic sources, upon activation, is configured to produce a combined average amplitude of less than 200 decibels (dB), integrated over about 10 seconds, at frequencies less than 1.7 Hertz (Hz). In some embodiments, the method comprises (d) correcting a seismic velocity model associated with the subterranean formation based on seismic data collected from the velocity activation pattern, and (e) creating a seismic image of the subterranean formation based on seismic data collected from the imaging activation pattern and the seismic velocity model corrected at (d).

An embodiment of a method for performing a seismic survey of an earthen subterranean formation comprises (a) deploying a node patch comprising a plurality of seismic receivers to an offshore seabed in a survey area, (b) deploying a surface vessel towing a array of seismic sources to the survey area located, wherein the array of seismic sources, upon activation, is configured to produce a combined average amplitude of less than 200 decibels (dB), integrated over about 10 seconds, at frequencies less than 1.7 Hertz (Hz), and (c) activating the array of seismic sources to generate seismic waves as the array of seismic sources is transported in an inline direction through the survey area whereby an imaging activation pattern and a velocity activation pattern are formed, wherein a lateral offset between the velocity activation pattern and the node patch is greater than a lateral offset between the imaging activation pattern and the node patch, wherein the velocity activation pattern comprises a plurality of separate velocity activation lines separated by gaps. In some embodiments, the plurality of gaps form at least part of the imaging activation pattern. In some embodiments, each of the plurality of velocity activation lines has a minimum width in a crossline direction, orthogonal to the inline direction, of at least 400 meters. In certain embodiments, a ratio of an average crossline width of the plurality of velocity activation lines to an average crossline width of the plurality of gaps is between 0.10 and 0.40. In certain embodiments, an activation density of each of the plurality of velocity activation lines is greater than an activation density of the imaging activation pattern. In some embodiments, the method comprises (d) correcting a seismic velocity model associated with the subterranean formation based on seismic data collected from the velocity activation pattern, and (e) creating a seismic image of the subterranean formation based on seismic data collected from the imaging activation pattern and the seismic velocity model corrected at (d).

An embodiment of a method for performing a seismic survey of an earthen subterranean formation comprises (a) deploying a node patch comprising a plurality of seismic receivers to an offshore seabed in a survey area, (b) deploying a surface vessel towing an array of seismic sources to the survey area, wherein each of the seismic sources comprises an airgun, and (c) activating the array of seismic sources to generate seismic waves as the array of seismic sources are transported in an inline direction through the survey area whereby an imaging activation pattern and a velocity activation pattern are formed, wherein a lateral offset between the velocity activation pattern and the node patch is greater than a lateral offset between the imaging activation pattern and the node patch, wherein the velocity activation pattern comprises a plurality of separate velocity activation lines separated by gaps. In some embodiments, the array of seismic sources, upon activation, is configured to produce a combined average amplitude of less than 200 decibels (dB), integrated over about 10 seconds, at frequencies less than 2.5 Hertz (Hz). In some embodiments, an activation density of each of the plurality of velocity activation lines is greater than an activation density of the imaging activation pattern. In certain embodiments, the plurality of gaps form at least part of the imaging activation pattern. In some embodiments, the method comprises (d) correcting a seismic velocity model associated with the subterranean formation based on seismic data collected from the velocity activation pattern, and (e) creating a seismic image of the subterranean formation based on seismic data collected from the imaging activation pattern and the seismic velocity model corrected at (d). In some embodiments, each of the plurality of velocity activation lines has a minimum width in a crossline direction, orthogonal to the inline direction, of at least 400 meters. In certain embodiments, each of the plurality of velocity activation lines has a minimum width in a crossline direction, orthogonal to the inline direction, of at least 500 meters.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 7 is a flowchart of an embodiment of a method for performing a seismic survey of an earthen subterranean formation; and FIGS. 8 and 9 are flowcharts of other embodiments of methods for performing a seismic survey of an earthen subterranean formation.

DETAILED DESCRIPTION

Figure 1:
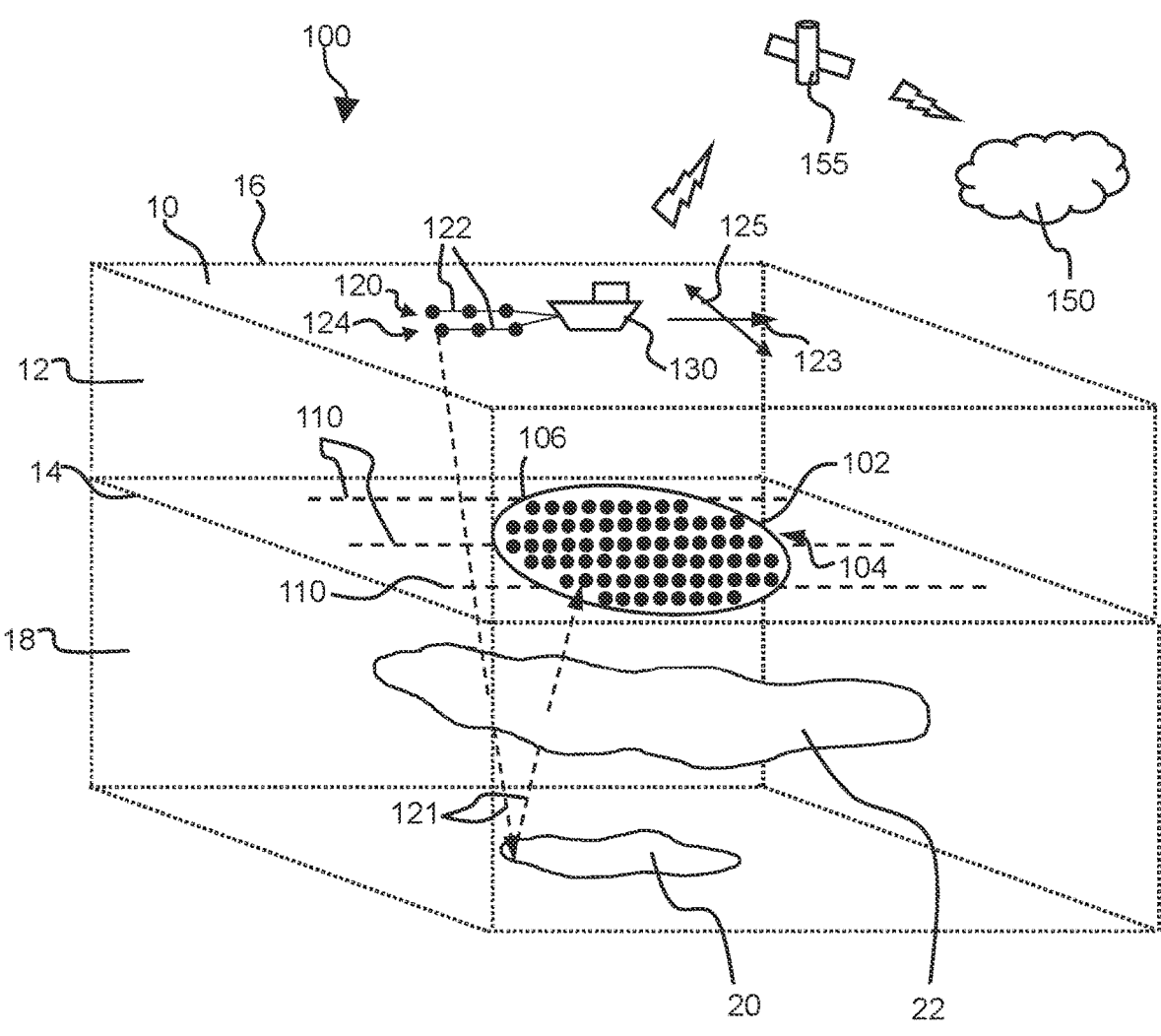
FIG. 1 is a schematic view of an embodiment of a system for performing a marine seismic survey.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 162 degrees to 88 degrees.

As described above, seismic surveys, including marine seismic surveys, reflect seismic waves off of features of earthen subterranean formations in order to collect information regarding the subterranean formations. The information collected from the reflected seismic waves may be used to create seismic images which may be used to identify subterranean features of interest such as, for example, hydrocarbon deposits. Seismic surveys, including marine seismic surveys, may additionally use diving waves to collect information regarding the velocity structure of the earth between the surface and a subterranean formation of interest. In areas with a complex subsurface velocity structure, producing a clear, detailed, accurate, and correctly spatially registered image typically requires both sufficient reflected waves to form the image and an accurate knowledge of the velocity structure of the earth so that the image is well focused and correctly located.

A seismic survey of a subterranean formation may include both an imaging survey and a velocity survey. As used herein, the term "imaging survey" is defined as a survey optimized to record reflected waves to use to create an image. Additionally, as used herein, the term "velocity survey" is defined as a survey optimized to record refracted and/or diving waves to produce an accurate velocity model. The velocity survey may be used to correct a velocity model of the formation and an imaging survey used to create an image of the formation and which may be based on the velocity model corrected by the velocity survey. The velocity survey and imaging survey may be performed together during a single deployment of the same seismic sources used to perform both the imaging and velocity surveys so as to minimize the overall time and expense required for performing the seismic survey. The velocity model comprises a subterranean model of seismic wave propagation velocity which may be used to translate subsurface reflection points of the seismic waves to their true depth. The velocity survey may be used to mitigate or eliminate errors in the velocity model which may result in a poorly migrated image, particularly in instances where the subterranean area of interest (AOI) is positioned beneath an intervening subterranean feature or formation (e.g., a complex subterranean salt feature, etc.).

Although the imaging and velocity surveys may be performed together during a single deployment of the seismic sources, the imaging and velocity surveys may have different requirements. For example, in at least some applications, the imaging survey may require a dense three-dimensional (3D) source coverage to produce a seismic image having relatively better noise suppression and greater detail. For example, a source point (a location at which one of the deployed seismic sources is activated) may be obtained every 25 meters (m) to 100 m in both inline (in the direction of travel of a vessel transporting the sources) and crossline (traverse to the direction of travel of the vessel transporting the sources) directions in an imaging survey. A node patch comprising a plurality of seabed located seismic receivers or nodes may be positioned above the subterranean AOI and may receive the reflected wave energy originally generated by the source points. The source points for the imaging survey may be positioned directly above or at a minor lateral offset (in the form of an imaging source halo extending about the node patch) relative to the node patch and AOI. As used herein, the term "lateral offset" refers to the lateral distance between a source point or a patch or line of source points and an outer periphery of the node patch. The nodes comprising the node patch may be spaced more widely than the source points of the imaging survey (e.g., 200 m to 1500 m in some applications).

While the relatively small, dense patch of source points of an imaging survey may lend themselves to creating a high-definition seismic image, the relatively small offsets of the source points for the imaging survey may not be capable of resolving large-scale intervening subterranean features. Thus, in performing a velocity survey, additional source points may be acquired in the form of a velocity source halo extending laterally beyond (e.g., 10 kilometers (km) to 15 km in at least some applications) and around the imaging source halo used for the imaging survey and which may have a similar density as the imaging source halo. The more horizontal reflecting seismic waves produced by the more greatly offset source points may be used by an algorithm such as, for example, a full waveform inversion (FWI) algorithm, to solve for an accurate 3D velocity model, which can then be used to create a clear registered image. However, the added number of source points included in the velocity source halo increases the amount of time (e.g., the number of passes of the vessel transporting the seismic sources across the velocity source halo) and concomitantly the expense associated with performing the seismic survey.

Velocity surveys typically do not require the same cross-line source density of an imaging survey, and instead the sources can be much more widely spaced because the most useful frequencies in a velocity survey are lower than in an imaging survey. To minimize the number of additional source points required for performing the velocity survey, in some applications high-powered, low-frequency (e.g., 2.0 Hertz (Hz) or less) specialized seismic sources (or source arrays) have been utilized for the velocity source halo such that, in lieu of a densely populated patch of source points, separate and distinct lines of source points (referred to herein as "activation lines") may be acquired outside of the imaging source halo for performing the velocity survey. In some applications, each activation line may comprise a single pass of the vessel transporting the seismic sources used in performing the imaging and velocity surveys, and neighboring activation lines may be spaced up to several kms apart. Such wide activation line spacings are generally sufficient for the purposes of velocity surveying if the sources are powerful enough at low frequencies that a single pass generates sufficient signal.

Conventional large airgun arrays are primarily designed to produce energy over frequencies of about 3-80 Hz, optimized for imaging surveys. The amplitude of the airgun array typically drops below 200 decibels (dB) (referenced to 1 microPascal (μPa) per Hertz (Hz) at 1 meter in the far field, i.e. including the source ghost, as per the Society of Exploration Geophysics (SEG) Standard for measuring the acoustic energy released per activation of marine sources) at approximately 2.5-3.0 Hz and continues dropping at about 15 dB per octave for lower frequencies. The SEG Standard referred to herein is described in detail at Fricke, J. R., Davis, J. M., and Reed, D. H., 1985, A Standard Quantitative Calibration Procedure for Marine Seismic Sources: Geophysics, 50, 1525-1532. Additionally, the naturally occurring seismic background noise of the Earth steadily increases in amplitude for frequencies below 2 Hz. For the purposes of a velocity survey recording usable data at frequencies below about 2.5 Hz may be key, with the lower the usable frequency the better. Specialized low-frequency seismic sources or source arrays optimized for velocity surveys, which can produce amplitudes of greater than 200 dB for frequencies below 2 Hz, currently exist but are not widely available as compared to conventional seismic sources. Thus, most velocity surveys are currently acquired using conventional sources optimized for the higher frequencies of imaging surveys.

Accordingly, embodiments disclosed herein include systems and methods for performing seismic surveys using spaced activation lines, wherein each activation line is comprised of velocity-source activation patterns containing multiple lines of shots. Embodiments disclosed herein include velocity activation patterns comprising the spaced activation lines which may be formed using conventional seismic sources such as seismic airguns. The activation lines may have a crossline width and/or density sufficient to achieve a signal-to-noise ratio such that a seismic velocity model may be accurately corrected by seismic data obtained using the velocity activation pattern within each activation line. For example, the centers of adjacent activation lines may be spaced 500 m to 5 km apart. The optimal spacing between adjacent activation lines may be determined by modeling the survey beforehand, using estimates of the size and depth of the velocity anomalies within the Earth to be resolved and the minimum usable frequencies of the recorded data. If seismic datasets that are good analogues for the expected challenges have already been acquired with a uniform dense sampling, then those existing datasets can be decimated to empirically determine the necessary minimal widths and spacing of the activation lines to achieve the survey goals.

Within each activation line, the velocity source activation patterns may have a minimum crossline source point spacing of 12.5 to 150 meters. The optimal crossline source point spacing may again be determined by modeling, in this case to find what density of source points is required to obtain the necessary signal quality in the recorded data. In some embodiments, the activation lines may have an activation density that is greater than an activation density of an imaging activation pattern executed in conjunction with the velocity activation pattern. As used herein, the term "activation density" is defined as the number of "shots" or activations of seismic sources per unit of area.

Conventional practice is to use the same activation density throughout the entire area of the survey. By instead grouping the shot points of the velocity-survey halo into spaced activation lines as described in embodiments herein, with the width and activation density within each activation line determined by the signal-to-noise requirements of the velocity survey, the number of activations comprising the velocity activation pattern may be minimized relative to conventional practice. For example, the number of activations in the velocity activation patterns described herein may have 50% or less of the number of activations in a similarly sized (e.g., having a similarly sized outer periphery) conventional velocity activation pattern (e.g., a uniformly dense patch or halo of activations). In this manner, the overall time and expense associated with performing the seismic survey may be minimized without the need of resorting to exotic, low-frequency and/or high-powered seismic sources.

Referring to FIG. 1, a system 100 for performing a marine seismic survey is shown. In this exemplary embodiment, survey system 100 comprises a system for performing marine seismic surveys offshore. Additionally, in this exemplary embodiment, survey system 100 comprises a system for performing both a velocity survey for correcting a velocity model and for performing an imaging survey for creating an image of an earthen subterranean formation based on the velocity model corrected by the velocity survey.

In this exemplary embodiment, the seismic survey performed by survey system 100 may conducted in a survey area 10 which includes a water column 12 extending from a sea bottom or seabed 14 to a water's surface or waterline 16. The survey area 10 additionally includes an earthen subterranean formation 18 extending beneath the seabed 14 and which includes a 3D AOI 20 positioned beneath the seabed 14. The AOI 20 may be an area or section of the subterranean formation 18 which may include hydrocarbon deposits or other materials of interest. Additionally, in this exemplary embodiment, a subterranean intervening feature 22 is positioned between the AOI 20 and the seabed 14. The intervening feature 22 may comprise a variety of subterranean features such as, for example, allochthonous salt or other features which may distort a seismic image unless adequately accounted for in a velocity model corrected by a velocity survey. In some applications, a plurality of intervening features 22 may be positioned between the AOI 20 and the seabed 14.

In this exemplary embodiment, survey system 100 generally includes a node gird or patch 102 positioned at the seabed 14, an array 124 of seismic sources (indicated generally by arrow 120 in FIG. 1) transported by a surface vessel 130 located at the waterline 16, and a computer system 150. Node patch 102 comprises a plurality of seismic receivers or nodes (indicated generally by arrow 104 in FIG. 1) configured to receive seismic energy or waves (indicated by arrows 121 in FIG. 1) produced by the seismic sources 120 that have interacted with the subterranean formation 18 and returned towards the surface, either by reflection, refraction, and/or by turning as diving waves. In some embodiments, seismic nodes 104 may be positioned at the seabed 14 by surface vessel 130 and/or another vessel of survey system 100 prior to the performance of the seismic survey.

Seismic nodes 104 may comprise hydrophones, geophones, or other devices configured to detect seismic or acoustic energy. Seismic nodes 104 are also configured to record seismic energy 121 produced by seismic sources 120 as active seismic data. The node patch 102 may be defined by an outer periphery 106 within which nodes 104 are positioned at a substantially uniform node density throughout the node patch 102. In some embodiments, seismic nodes 104 may be spaced approximately between 200 m and 1500 m from each other within the node patch 102; however, in other embodiments, the spacing of seismic nodes 104 may vary. In some embodiments the density of nodes will be higher in the area above the AOI 20. The density of seismic nodes 104 may be lower for nodes 104 that are not expected to be useful for imaging, but only for the purposes of the velocity survey. Although the outer periphery 106 is shown as circular in this exemplary embodiment, in other embodiments, the outer periphery 106 of node patch 102 may be a variety of regular or irregular shapes.

In this exemplary embodiment, in addition to the seismic nodes 104 located within node patch 102, survey system 100 includes additional seismic nodes 104 extending from node patch 102 in the form of outrigger node lines 110 (individual nodes 104 of each line 110 are hidden in FIG. 1). Each outrigger node line 110 comprises a plurality of seismic nodes 104 spaced along the node line 110. Additionally, in this exemplary embodiment, each outrigger node line 110 extends from the node patch 102. However, in other embodiments, outrigger node lines 110 may extend in other directions such as, for example, in a circumferentially spaced pattern extending radially outwards from node patch 102. Outrigger node lines 110 may provide enhanced wide lateral offset coverage. However, in other embodiments, survey system 100 may not include outrigger node lines 110. For example, in some embodiments, survey system 100 may only include the seismic nodes 104 forming node patch 102.

In this exemplary embodiment, each seismic source 120 is connected to one of a pair of laterally spaced tow lines 122 each of which are connected to surface vessel 130. Although in this exemplary embodiment seismic sources 120 are connected to a pair of tow lines 122, in other embodiments, seismic sources 120 may be connected to surface vessel 120 via a single tow line 122 or more than two tow lines 122. During the performance of a seismic survey, surface vessel 120 travels in an inline direction (indicated by arrow 123 in FIG. 1) as the seismic sources 120 are each activated (sources 120 being positioned near but below the waterline 16) to generate seismic energy which is eventually received by at least some of the seismic nodes 104 of node patch 102. The pair of tow lines 122 of this embodiment are spaced orthogonal to the inline direction 123 in a crossline direction (indicated by arrow 125 in FIG. 1).

In this exemplary embodiment, the array 124 of seismic sources 120, upon activation, is configured to produce seismic waves at a combined average amplitude below 200 dB, integrated over about 10 seconds, at frequencies below 2.5 Hz, and thus are not as powerful as the specialized sources powerful enough that widely spaced single lines of source activations provide sufficient signal. The seismic sources 120 may comprise conventional seismic airguns, vibratory sources, and/or other seismic sources, for example low-pressure high-volume compressed-air-release sources. For the purposes of this invention, the precise type of source does not matter; what matters is its low-frequency performance. In other embodiments, the frequency and power output of the array 124 of seismic sources 120 may vary. For example, in other embodiments, the array 124 of seismic sources 120, upon activation, is configured to produce seismic waves at a combined average amplitude level below about 200 dB, integrated over about 10 seconds, at frequencies below 1.7 Hz, such that they are more powerful than conventional airguns but still not powerful enough that widely spaced single lines of source activations provide sufficient signal. Additionally, in this exemplary embodiment, survey system 100 comprises approximately 16 seismic sources 120 forming the source array 124, with the sources 120 of the source array 124 spaced approximately 50 m in the crossline direction 125; however, in other embodiments, the number of seismic sources 120 and their relative spacing may vary. Depending on the type of source, in some embodiments a "source point" may correspond to the activation of a single source, while in others a "source point" may correspond to the activation of an array of sources.

Following the deployment of seismic nodes 104 to the seabed 14 by a deployment vessel (not shown in FIG. 1) of survey system 100, surface vessel 130 travels across the waterline 16 as the array 124 of seismic sources 120 is activated in a predefined sequence, whereby a predefined pattern of source points (each corresponding to a location at which one or more of the seismic sources 120, forming the source array 124, is activated) are obtained, as will be described further herein. The seismic nodes 104 of node patch 102 capture seismic energy generated by the seismic sources 120 and reflected by the subterranean formation 18 and record the captured seismic energy as active seismic data Once the predefined pattern of source points has been obtained and the seismic energy generated by seismic sources 120, returning to the surface after interacting with subterranean formation 18, has been recorded by seismic nodes 104 as active seismic data, the seismic nodes 104 may be retrieved from the seabed 14 by a retrieval vessel (not shown in FIG. 1) to the waterline 16 to complete the seismic survey (including both the imaging survey and the velocity survey). Once retrieved from the seabed 14, the active seismic data recorded by seismic sources 120 may be transferred to the computer system 150 of survey system 100. In this exemplary embodiment, at least part of computer system 150 is remote to the survey area 10 and is in communication with component of survey system 100 positioned at or proximal to the survey area 10 by a communication system 155 including, for example, a satellite. For example, computer system 150 may comprise a plurality of separate computer systems, with one or more of the computer systems being located in the survey area 10 and one or more others remote from the survey area 10. For example, the computer system 150 may comprise one or more virtual servers in a cloud computing environment. In other embodiments, computer system 150 may be entirely located at or proximal to the survey area 10.

In this exemplary embodiment, computer system 150 is generally configured to analyze the seismic waveforms acquired by the seismic nodes 104 to determine seismic information regarding the geological structure, the location and property of hydrocarbon deposits, and the like within the subterranean formation 18. For example, computer system 150 may correct a velocity model associated with the subterranean formation 18 based on the active seismic data captured by the seismic nodes 104 and associated with the velocity survey performed by survey system 100. Additionally, computer system 150 is configured to create one or more seismic images associated with the subterranean formation 18 (including AOI 20) based on both the active seismic data captured by nodes 104 associated with the imaging survey performed by survey system 100 and on the corrected velocity model.

Figure 2:
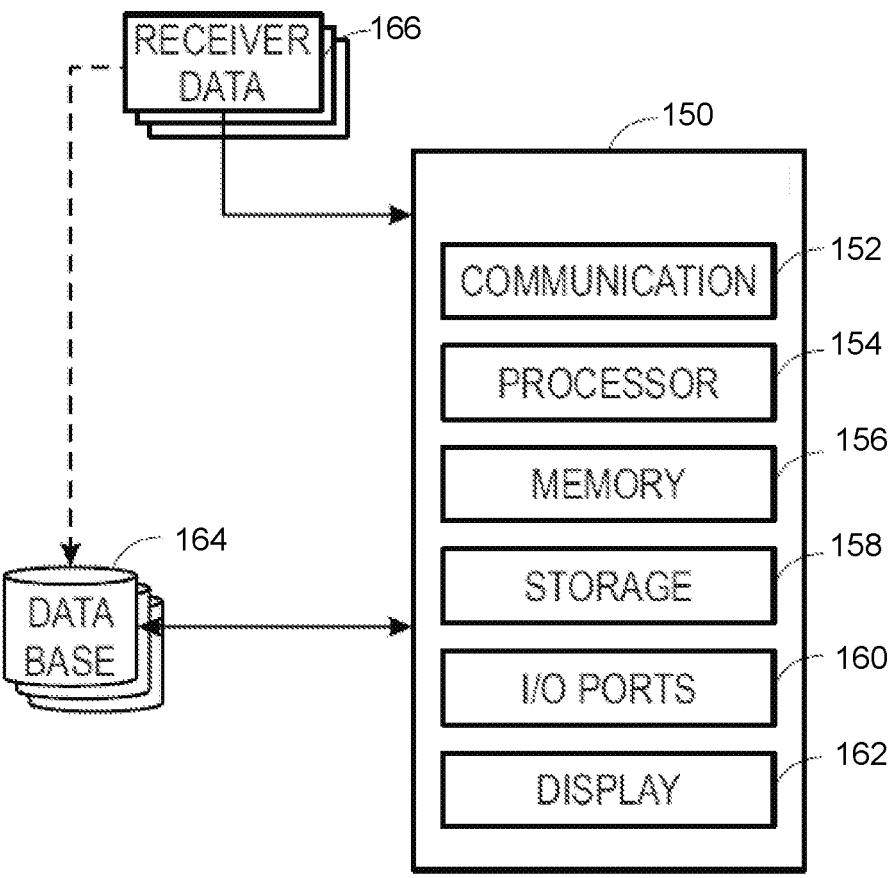
FIG. 2 is a schematic view of an embodiment of a computer system of the survey system of FIG. 1.

Referring now to FIG. 2, features of the computer system 150 of survey system 100 are shown in greater detail. In this exemplary embodiment, computer system 150 may include a communication component 152, a processor 154, memory 156, storage 158, input/output (I/O) ports 160, and a display 162. In some embodiments, computer system 150 may omit one or more of the display 162, the communication component 152, and/or the input/output (I/O) ports 160. The communication component 152 may be a wireless or wired communication component that may facilitate communication between the seismic nodes 104, one or more databases 164, other computing devices, and/or other communication capable devices. In one embodiment, computer system 150 may receive receiver or node data 166 (e.g., seismic data, seismograms, etc.) via a network component, the database 164, or the like. The processor 154 of computer system 150 may analyze or process the receiver data 166 to ascertain various features regarding geological formations within the superannuation formation 18 (including the AOI 20) of the Earth.

The processor 154 may be any type of computer processor or microprocessor capable of executing computer-executable code. The processor 154 may also include multiple processors that may perform the operations described below. The memory 156 and the storage 158 may be any suitable articles of manufacture that can serve as media to store processor-executable code, data, or the like. These articles of manufacture may represent computer-readable media (e.g., any suitable form of memory or storage) that may store the processor-executable code used by the processor 154 to perform the presently disclosed techniques. Generally, the processor 154 may execute software applications that include programs that process seismic data acquired via receivers of a seismic survey according to the embodiments described herein.

The memory 156 and the storage 158 may also be used to store the data, analysis of the data, the software applications, and the like. The memory 156 and the storage 158 may represent non-transitory computer-readable media (e.g., any suitable form of memory or storage) that may store the processor-executable code used by the processor 154 to perform various techniques described herein. It should be noted that non-transitory merely indicates that the media is tangible and not a signal.

The I/O ports 160 may be interfaces that may couple to other peripheral components such as input devices (e.g., keyboard, mouse), sensors, input/output (I/O) modules, and the like. I/O ports 160 may enable computer system 150 to communicate with the other devices in the survey system 100 or the like via the I/O ports 160.

The display 162 may depict visualizations associated with software or executable code being processed by the processor 154. In one embodiment, the display 162 may be a touch display capable of receiving inputs from a user of computer system 150. The display 162 may also be used to view and analyze results of the analysis of the acquired seismic data to determine the geological formations within the subterranean formation 18, the location and property of hydrocarbon deposits within the subterranean formation 18, predictions of seismic properties associated with one or more wells in the subterranean formation 18, and the like. The display 162 may be any suitable type of display, such as a liquid crystal display (LCD), plasma display, or an organic light emitting diode (OLED) display, for example. In addition to depicting the visualization described herein via the display 162, it should be noted that computer system 150 may also depict the visualization via other tangible elements, such as paper (e.g., via printing) and the like.

With the foregoing in mind, the present techniques described herein may also be performed using a supercomputer that employs multiple computer systems 150, a cloud-computing system, or the like to distribute processes to be performed across multiple computer systems 150. In this case, each computer system 150 operating as part of a super computer may not include each component listed as part of computer system 150. For example, each computer system 150 may not include the display 162 since multiple displays 162 may not be useful to for a supercomputer designed to continuously process seismic data.

After performing various types of seismic data processing, computer system 150 may store the results of the analysis in one or more databases 164. The databases 164 may be communicatively coupled to a network that may transmit and receive data to and from computer system 150 via the communication component 152. In addition, the databases 164 may store information regarding the subterranean formation 18, such as previous seismograms, geological sample data, seismic images, and the like regarding the subterranean formation 18. Although the components described above have been discussed with regard to computer system 150, it should be noted that similar components may make up computer system 150. Moreover, computer system 150 may also be part of the survey system 100, and thus may monitor and control certain operations of the seismic sources 120, the nodes 104, and the like. Further, it should be noted that the listed components are provided as example components and the embodiments described herein are not to be limited to the components described with reference to FIG. 2.

In some embodiments, computer system 150 may generate a two-dimensional representation or a three-dimensional representation of the subterranean formation 18 based on the seismic data received via the seismic nodes 104 described above. Additionally, seismic data associated with multiple source/node combinations may be combined to create a near continuous profile of the subterranean formation 18 that can extend for some distance. In a two-dimensional (2-D) seismic survey, the node locations may be placed along a single line, whereas in a three-dimensional (3-D) survey the node locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subterranean formation 18. In addition, a 4-D (or time-lapse) seismic survey may include seismic data acquired during a 3-D survey at multiple times. Using the different seismic images acquired at different times, computer system 150 may compare the two images to identify changes in the subterranean formation 18.

In any case, a seismic survey may be composed of a very large number of individual seismic recordings or traces. As such, computer system 150 may be employed to analyze the acquired seismic data to obtain an image representative of the subterranean formation 18 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After computer system 150 analyzes the acquired seismic data, the results of the seismic data analysis (e.g., seismogram, seismic images, map of geological formations, etc.) may be used to perform various operations within the hydrocarbon exploration and production industries. As an example, locations and properties of hydrocarbon deposits within subterranean formation 18 associated with the respective seismic survey performed using survey system 10 may be determined based on the analyzed seismic data. Based on the identified locations and properties of the hydrocarbon deposits, certain positions or parts of the subterranean formation 18 (e.g., the AOI 20) may be explored. After exploration equipment has been placed within the subsurface region, the hydrocarbons that are stored in the hydrocarbon deposits may be produced via natural flowing wells, artificial lift wells, and the like. The produced hydrocarbons may then be transported to refineries and the like via transport vehicles, pipelines, and the like for processing.

In some embodiments, the results of the seismic data analysis may be generated in conjunction with a seismic processing scheme that includes seismic data collection, editing of the seismic data, initial processing of the seismic data, signal processing, conditioning, and imaging (which may, for example, include production of imaged sections or volumes (which may, for example, include production of imaged sections or volumes) in prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result, location of hydrocarbons within a subterranean formation 18 may be identified.

Referring again to FIG. 1, as described above, seismic system 100 may be used to perform both a velocity survey and an imaging survey in a single deployment of node patch 102 and seismic sources 120 via surface vessel 130. Particularly, surface vessel 130 may travel across the waterline 16 as the array 124 of seismic sources 120 is activated in a predefined sequence, whereby a predefined pattern of source points are obtained. wherein a first or imaging activation pattern of the source point pattern is associated with the imaging survey while a second or velocity activation pattern, different from but potentially overlapping the imaging activation pattern, is associated with the velocity survey. Data obtained from the velocity activation pattern of the source point pattern may be used to correct the velocity model while data obtained from the imaging activation pattern of the source point pattern may be used to create one or more seismic images that are based on the corrected velocity model.

Figure 3:
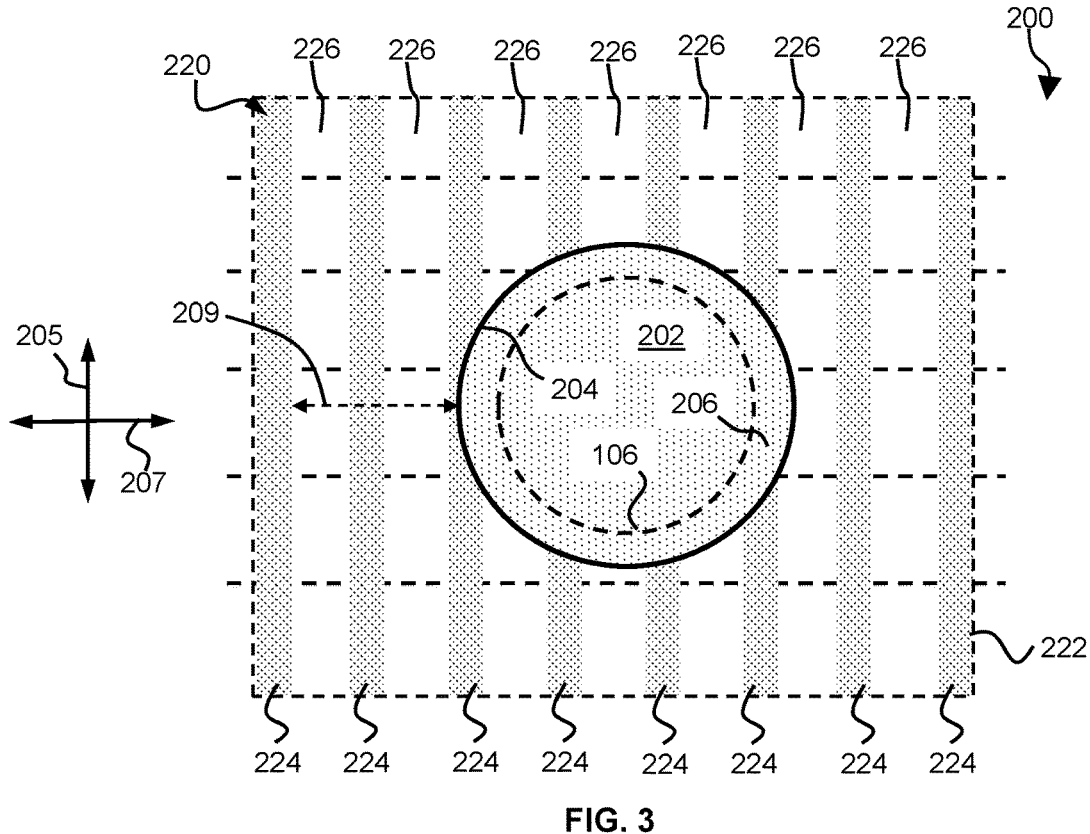
FIG. 3 is a schematic view of an embodiment of a seismic survey design associated with the survey system of FIG. 1.

Referring now to FIG. 3, a seismic survey design 200 associated with the survey system 100 shown in FIG. 1 is conceptually illustrated in FIG. 3. Particularly, survey system 100 may be used to execute the seismic survey design 200 as part of performing a seismic survey that includes both a velocity survey and an imaging survey. The methodology disclosed herein does not necessarily render the seismic survey design 200 in a human perceptible form. FIG. 3 is used only to illustrate selected aspects of the seismic survey design 200 to further an understanding of the presently disclosed subject matter. In this exemplary embodiment, seismic survey design 200 includes a densely shot imaging activation pattern 202 and a relatively sparsely shot velocity activation pattern 220.

The imaging activation pattern 202 of seismic survey design 200 comprises a dense pattern of "shots" or activations of the array 124 of seismic sources 120 located within an outer periphery 204 of the imaging activation pattern 202. While the outer periphery 204 is shown as circular in FIG. 3, it may be understood that the outer periphery 204 of imaging activation pattern 202 may comprise any regular or irregular shape and may be different than the shape imaging activation pattern 202 of seismic survey design 200. The seismic survey design 200 may thus be formed by transporting seismic sources 120 via surface vessel 130 and repeatedly activating the array 124 of seismic sources 120 across the location defined by outer periphery 204 until the final predefined pattern of imaging source points is obtained within the outer periphery 204. In this exemplary embodiment, imaging activation pattern 202 may have an average crossline spacing between adjacent sources of approximately between 25 m and 150 m. For example, in some embodiments, the source points of imaging activation pattern 202 may be spaced approximately between an average of 12.5 m and 50 m in the inline direction (indicated by arrow 205 in FIG. 3) and approximately between 25 m and 150 m apart in the crossline direction (indicated by arrow 207 in FIG. 3). However, in other embodiments, the density and spacing of the source points comprising imaging activation pattern 202 may vary.

The node patch 102 may be centrally positioned with respect to the imaging activation pattern 202 and velocity activation pattern 220. Additionally, the imaging activation pattern 202 may correspond in size and shape to the size and shape of node patch 102 (the outer periphery 106 of node patch 102 is shown in FIG. 3 to indicate the relative positioning of node patch 102 relative to activation patterns 202, 220). The imaging activation pattern 202 may be positioned directly above the seabed 14 located node patch 102. In this exemplary embodiment, the imaging activation pattern 202 has a diameter that is greater than the diameter of the node patch 102, thereby forming an annular imaging shot halo 206 which entirely surrounds the node patch 102. Imaging shot halo 206 provides a region having a greater lateral offset (e.g., the lateral distance between the activated seismic source 120 and the outer periphery 106 of the node patch 102) than the region of imaging activation pattern 202 aligned or formed within node patch 102 and which may allow for greater illumination of the AOI 20. In other embodiments, imaging activation pattern 202 may not include imaging shot halo 206.

The velocity activation pattern 220 of seismic survey design 200 comprises a pattern of shots or activations of the array 124 of seismic sources 120 located within an outer periphery 222 of the velocity activation pattern 220 and which envelopes the outer periphery 204 of imaging activation pattern 202. While the outer periphery 222 is shown as rectangular in FIG. 3, it may be understood that the outer periphery 222 of velocity activation pattern 220 may comprise any regular or irregular shape. As with the imaging activation pattern 202, velocity activation pattern 220 may be formed by transporting seismic sources 120 via surface vessel 130 and repeatedly activating the array 124 of seismic sources 120 across the location defined by outer periphery 222 until the final predefined pattern of velocity source points is obtained within the outer periphery 222.

However, unlike imaging activation pattern 202, velocity activation pattern 220 does not comprise a substantially uniform pattern of densely spaced shots. Instead, in this exemplary embodiment, velocity activation pattern 222 comprises a plurality of spaced velocity activation lines 224 separated by gaps 226 and each extending in the inline direction 205. As used herein, the term "activation line" is defined as a zone formed by repeated activations of an array of seismic sources towed by a surface vessel passing through the single activation line in an inline direction. A single activation line may be formed by multiple passes of surface vessel through the single activation line (the array of seismic sources being activated during each pass).

Some, if not all, of the velocity activation lines 224 are laterally spaced (e.g., in the crossline direction 207) from the imaging activation pattern 202 such that velocity source points of the velocity activation lines 224 are positioned at a significantly greater lateral offset relative to the node patch 102 than the imaging source points of the imaging activation pattern 202 relative to the node patch 102. For reference, a single lateral offset 209 between an outermost velocity activation line 224 and the outer periphery 106 of node patch 102 is shown in FIG. 3. As will be discussed further herein, the greater lateral offset provided by velocity activation lines 224 permits the velocity survey conducted using system 100 to successfully probe intervening subterranean features such as, for example, the subterranean intervening feature 22 positioned between AOI 20 and the node patch 102.

Figure 4:
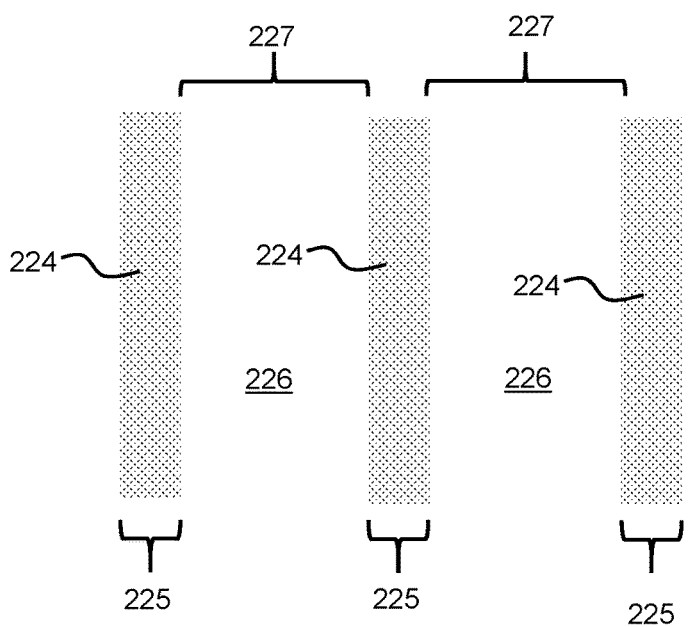
FIG. 4 is a schematic view of velocity activation lines of the seismic survey design of FIG. 3.

Referring to FIGS. 3 and 4, an additional view of some of the velocity activation lines 224 and corresponding gaps 226 are shown in FIG. 4. In this exemplary embodiment, each velocity activation line 224 comprises a "fat activation line" defined herein as an activation line having a minimum crossline width of at least 400 m. For this reason, velocity activation lines 224 may also be referred to as "fat" source or activation lines given their greater width 225 in the crossline direction 207 relative to a single activation line. Fat activation lines may be formed by repeatedly activating an array of seismic sources towed by a surface vessel several which makes a plurality of passes back and forth through the fat activation line with the array of seismic sources being activated during each pass. Alternatively, fat activation lines could be formed by a single pass of a surface vessel utilizing a sufficiently wide source array towed behind the surface vessel. Further, the crossline spacing of the seismic source points could also be halved by shooting the same shot line again, but with a lateral shift of half the crossline source point spacing. Once they become available, these methods could be used in conjunction with the acquisition designs shown in FIG. 3-6.

In this exemplary embodiment, each velocity activation line 224 has a crossline width 225 that is approximately between 400 m to 1 km, while each gap 226 has a crossline width 227 that is approximately between 1 km and 4 km wide. In some embodiments, the crossline width 225 of each velocity activation line 224 is approximately 500 m, while the crossline width 227 of each gap 226 is approximately 1.5 km. However, in other embodiments, the crossline widths 225, 227 of each velocity activation line 224 and/or gap 226, respectively, may vary. Additionally, in this exemplary embodiment, a ratio of an average crossline width 225 of the velocity activation lines 224 to an average crossline width 227 of gaps 226 is approximately between 0.10 and 0.40. If there is an existing library of conventional acquisitions to reference, optimal configurations can be found by processing decimated versions of the existing data to simulate various "fat shot line" acquisitions.

In this exemplary embodiment, the requirements of the velocity survey may vary from the requirements of the imaging survey of a given seismic survey. For example, in at least some applications, the imaging survey may require a dense carpet of source points (such as that provided by imaging activation pattern 202) to produce a seismic image having greater detail and better noise suppression. Additionally, in at least some applications, the velocity survey of a seismic survey may require at least some source points having a greater lateral offset than the source points of the imaging survey in order to more fully and accurately probe intervening subterranean features (e.g., intervening subterranean feature 22 shown in FIG. 1) with seismic waves which travel relatively more horizontally with respect to the intervening subterranean features. Further, while the velocity survey may require source points having a relatively greater lateral offset than the source points of the imaging survey, the velocity survey may not require a dense carpet of source points at relatively wide lateral offsets in order to correct the velocity model. Particularly, propagation via the wave equation discriminates against seismic energy that cannot be represented as a coherent wave when there is a sufficient density of source points for the seismic waves to be recorded coherently. In other words, the wave equation may be utilized to enhance the signal-to-noise ratio obtained from conventional seismic sources such as airguns. Moreover, while the quality of a seismic image created based on a velocity model corrected by a velocity survey (e.g., via a FWI algorithm based on data acquired from the velocity survey) may only increase in response to the inclusion of additional source points up to a certain point, the inclusion of additional source points at wide lateral offsets no longer meaningfully improves the quality of the seismic image.

In view of the above, the velocity activation pattern 220 of seismic survey design 200 reduces the number of velocity source points relative to the velocity activation patterns of conventional seismic survey designs which instead include a uniformly dense (e.g., less than 50 m spacing between source points in the inline direction and less than 200 m in the crossline direction) carpet of source points extending to wide lateral offsets (e.g., several kms from the outer periphery of the node patch). For example, velocity activation pattern 220 may only have 50% or less (e.g., 25%) of the number of source points relative to a velocity activation pattern of a conventional seismic survey design which instead relies on a uniformly dense carpet of source points for the velocity survey. The significant reduction in the number of source points for velocity activation pattern 220 relative to conventional seismic survey designs may in-turn significantly decrease the time and expense required in performing the seismic survey relative to conventional seismic surveys.

Additionally, the velocity activation pattern 220 need not rely on low-frequency sources and instead may be formed with conventional seismic sources such as airguns and the like. Particularly, a sufficient signal-to-noise ratio may be maintained by the velocity activation pattern 220 via providing each velocity activation line 224 with a sufficient minimal crossline width 225 (e.g., 100 m to 1 km) in order to provide a sufficient crossline shot density for purposes of correcting the velocity model. The power output at low frequencies for different types of commonly available seismic sources may vary. In-turn, the minimal crossline width required to provide a sufficient shot density for purposes of correcting the velocity model may vary based on the configuration of the seismic sources used in conducting the velocity survey. Particularly, the crossline width of velocity activation patterns 220 may be negatively correlated with the power output at low frequencies of the seismic sources utilized in the seismic survey.

Figure 5:
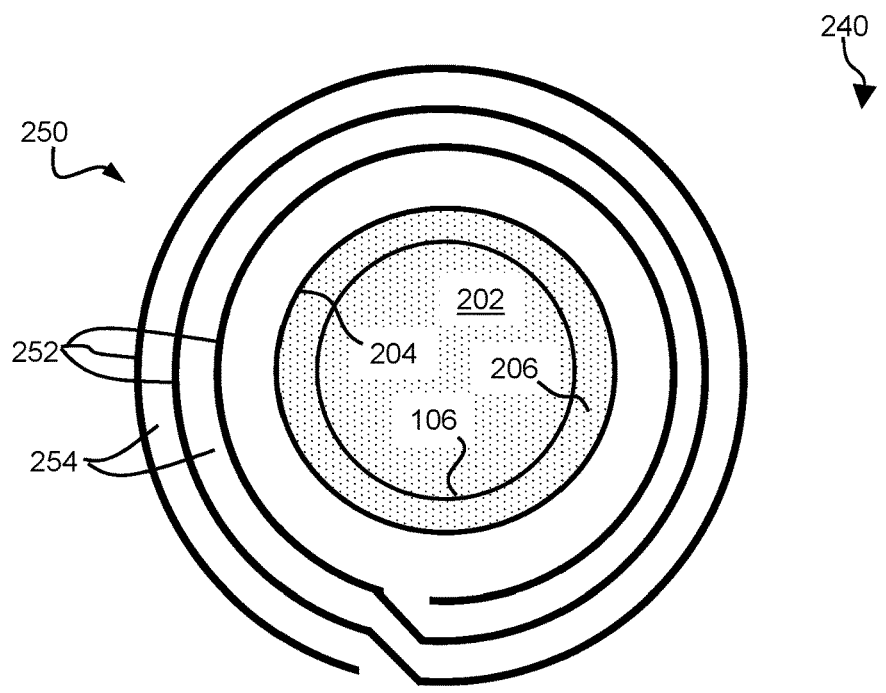
FIGS. 5 and 6 are schematic views of other embodiments of seismic survey designs associated with the survey system of FIG. 1.

Referring now to FIG. 5, another embodiment of a seismic survey design 240 which may be executed by the survey system of FIG. 1 is shown in FIG. 5. Seismic survey design includes features in common with the seismic survey design 200 shown in FIGS. 3 and 4. For example, seismic survey design 240 includes imaging activation pattern 202. However, in contrast to the substantially rectilinear velocity activation lines 224 of velocity activation pattern 220 shown in FIGS. 3, 4, seismic survey design 240 comprises a velocity activation pattern 250 including orbital or circumferential activation lines 252 which comprise fat activation lines (formed via multiple passes of a surface vessel with the array of seismic sources towed by the surface vessel activated during each pass) and extend at least partially, circumferentially about the outer periphery 204 of the imaging activation pattern 202. Additionally, circumferential activation lines 252 are separated by annular gaps 254 which also extent at least partially, circumferentially about the outer periphery 204 of imaging activation pattern 202.

Circumferential activation lines 252 and annular gaps 254 may each have a crossline width that is similar to the crossline widths 225, 227 of the velocity activation lines 224 and corresponding gaps 226 shown in FIGS. 3, 4. In some embodiments, an outermost of the circumferential activation lines may extend approximately 5 km to 20 km from the node patch 102. The circumferential activation lines 252 may present a relatively more efficient pattern for acquiring source points (e.g., fewer passes of the surface vessel 130 required to execute the velocity activation pattern 250 relative to velocity activation pattern 200 for the same number of source points) in at least some applications.

Unlike the imaging activation pattern 202 shown in FIGS. 3-5, in some applications, the area of the imaging activation pattern may nearly overlap with the area of the velocity activation pattern. In such instances multiple surface vessels (e.g., a plurality of surface vessels 130) each towing a separate set of one or more seismic sources (e.g., seismic sources 120) may be utilized for executing the imaging activation pattern and the velocity activation pattern. Additionally, in some embodiments, to ensure sufficient density of source points or seismic source activations for the velocity survey, the crossline spacing of individual source points of each velocity activation line 224 may be less than the crossline spacing of individual source points of the imaging activation pattern 202. For example, in some embodiments, the crossline spacing between individual source points of each velocity activation line 224 may be half as much as the crossline spacing between individual source points of imaging activation pattern 202 (e.g., 50 m vs 100 m, for example).

Figure 6:
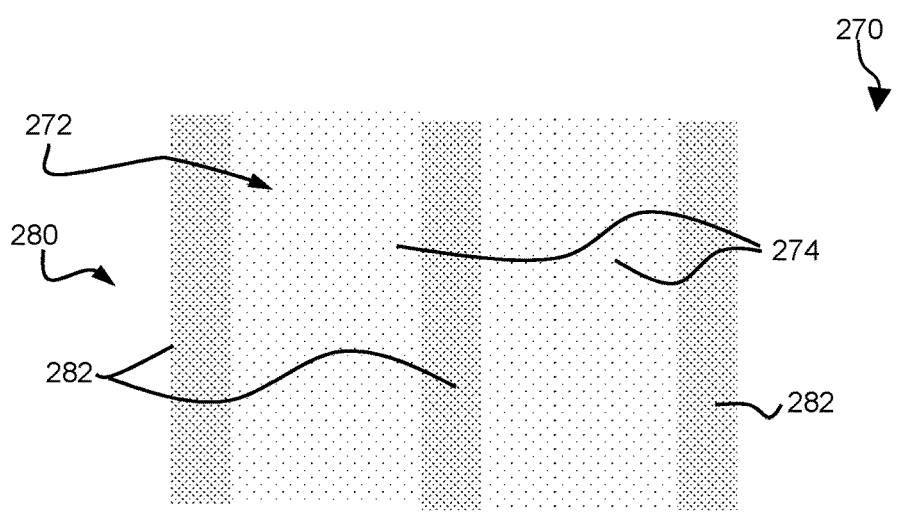

Referring to FIG. 6, another embodiment of a seismic survey design 270 which may be executed by the survey system of FIG. 1 is shown in FIG. 6. Seismic survey design 270 includes an imaging activation pattern 272 and a velocity activation pattern 280. In this exemplary embodiment, imaging activation pattern 272 comprises separate imaging activation lines 274 each positioned between a plurality of velocity activation lines 282 comprising the velocity activation pattern 280. Additionally, in this exemplary embodiment, each velocity activation line 282 may have a greater activation density (the number of source points per surface area) than the imaging activation lines 274 forming the imaging activation pattern 272. For example, each velocity activation line 284 may have a crossline spacing between individual source points of approximately 50 m while each imaging activation line 274 may have a crossline spacing between individual source points of approximately 100 m. In other embodiments, the crossline spacing of the source points of the imaging activation lines 274 and velocity activation lines 282 may vary. In some embodiments, a ratio of the crossline spacing of adjacently located source points of the imaging activation lines 274 to the crossline spacing of adjacently located source points of the velocity activation lines 282 may be approximately between 1.5:1 to 3:1.

In some embodiments, the imaging activation lines 274 of imaging activation pattern 272 may be formed by a first surface vessel towing a first plurality of seismic sources while the velocity activation lines 282 of imaging activation pattern 280 may be formed by a second vessel towing a second plurality of seismic sources, the second surface vessel and the second plurality of seismic sources being different from the first surface vessel and the second plurality of seismic sources. For example, the first surface vessel and first plurality of seismic sources may be configured to produce source points spaced a first distance apart (e.g., 100 m apart) while the second surface vessel and second plurality of seismic sources may be configured to produce source points spaced a second distance apart (e.g., 50 m apart) that is less than the first distance. Alternatively, a single surface vessel and a single plurality of seismic sources may be used to form both the imaging activation lines 274 and the velocity activation lines 282. For example, the single vessel may form the relatively denser velocity activation lines 282 by making more passes over a given crossline distance than when forming the less dense imaging activation lines 274.

Referring to FIG. 7, a method 300 for performing a seismic survey of an earthen subterranean formation is shown. Beginning at block 302, method 300 comprises deploying a node patch (e.g., node patch 102 shown in FIG. 1) comprising a plurality of seismic receivers (e.g., seismic receivers 104 shown in FIG. 1) to an offshore seabed in a survey area (e.g., survey area 10 shown in FIG. 1). At block 304, method 300 comprises deploying a surface vessel (e.g., surface vessel 130 shown in FIG. 1) towing an array of seismic sources (e.g., seismic sources 120 shown in FIG. 1) to the survey area located, wherein each of the seismic sources comprises an airgun.

At block 306, method 300 comprises activating the array of seismic sources to generate seismic waves as the array of seismic sources are transported in an inline direction (e.g., inline direction 123 shown in FIG. 1) through the survey area whereby an imaging activation pattern (e.g., imaging activation pattern 202 shown in FIG. 3) and a velocity activation pattern (e.g., imaging activation pattern 220 shown in FIG. 3) are formed, wherein a lateral offset between the velocity activation pattern and the node patch is greater than a lateral offset between the imaging activation pattern and the node patch. In some embodiments, the node patch may be centrally positioned with respect to the imaging activation pattern and the velocity activation pattern. For example, in certain embodiments, the imaging activation pattern may be located directly above the node patch positioned on the seabed. In some embodiments, the velocity activation pattern comprises a plurality of separate velocity activation lines (e.g., velocity activation lines 224 shown in FIG. 3) separated by gaps (e.g., gaps 226 shown in FIG. 3).

In certain embodiments, method 300 comprises correcting a seismic velocity model associated with the subterranean formation based on seismic data collected from the velocity activation pattern, and creating a seismic image of the subterranean formation based on seismic data collected from the imaging activation pattern and the corrected seismic velocity model. A technique for processing recorded seismic data into an image may begin with organizing and sorting the data, removing bad or excessively noisy traces, correcting timing and position errors, etc. An initial velocity model may be created using pre-existing data. In a virgin area the initial velocity model may be very simplistic. For example, it may be based on regional geological trends. In an area with existing seismic data quite detailed velocity models may already exist. The recorded data may then be used to improve the initial velocity model, where the initial velocity model serves as the starting point for an iterative inversion process (e.g. "FWI", Full-waveform inversion) that adjusts the model to better fit the recorded data. The velocity survey data is typically most important in the early stages of the inversion, which correct gross errors in the velocity model. However, the imaging survey data may become more important at later stages of the inversion. The improved velocity model may then used to "migrate" the seismic data to produce an image using, for example, an algorithm like RTM (reverse-time migration).

Referring to FIG. 8, a method 320 for performing a seismic survey of an earthen subterranean formation is shown. Beginning at block 322, method 320 comprises deploying a node patch (e.g., node patch 102 shown in FIG. 1) comprising a plurality of seismic receivers (e.g., seismic receivers 104 shown in FIG. 1) to an offshore seabed in a survey area (e.g., survey area 10 shown in FIG. 1). At block 324, method 320 comprises deploying a surface vessel (e.g., surface vessel 130 shown in FIG. 1) towing an array of seismic sources (e.g., seismic sources 120 shown in FIG. 1) to the survey area located.

At block 326, method 320 comprises activating the array of seismic sources to generate seismic waves as the array of seismic sources are transported in an inline direction (e.g., inline direction 123 shown in FIG. 1) through the survey area whereby an imaging activation pattern (e.g., imaging activation pattern 202 shown in FIG. 3) and a velocity activation pattern (e.g., velocity activation pattern 220 shown in FIG. 3) are formed, wherein a lateral offset between the velocity activation pattern and the node patch is greater than a lateral offset between the imaging activation pattern and the node patch. In some embodiments, the node patch may be centrally positioned with respect to the imaging activation pattern and the velocity activation pattern. For example, in certain embodiments, the imaging activation pattern may be located directly above the node patch positioned on the seabed. In some embodiments, the velocity activation pattern comprises a plurality of separate velocity activation lines (e.g., velocity activation lines 224 shown in FIG. 3) separated by gaps (e.g., gaps 226 shown in FIG. 3), and wherein each of the plurality of velocity activation lines has a minimum width in a crossline direction, orthogonal to the inline direction, of at least 400 meters. In certain embodiments, method 320 comprises correcting a seismic velocity model associated with the subterranean formation based on seismic data collected from the velocity activation pattern, and creating a seismic image of the subterranean formation based on seismic data collected from the imaging activation pattern and the corrected seismic velocity model.

Referring to FIG. 9, a method 340 for performing a seismic survey of an earthen subterranean formation is shown. Beginning at block 342, method 340 comprises deploying a node patch (e.g., node patch 102 shown in FIG. 1) comprising a plurality of seismic receivers (e.g., seismic receivers 104 shown in FIG. 1) to an offshore seabed in a survey area (e.g., survey area 10 shown in FIG. 1). At block 344, method 340 comprises deploying a surface vessel (e.g., surface vessel 130 shown in FIG. 1) towing an array of seismic sources (e.g., seismic sources 120 shown in FIG. 1) to the survey area located, wherein each of the seismic source arrays 124, upon activation, is configured to produce a combined average amplitude of less than 200 dB, integrated over about 10 seconds, at frequencies less than 1.7 Hz.

At block 346, method 340 comprises activating the array of seismic sources to generate seismic waves as the array of seismic sources are transported in an inline direction (e.g., inline direction 123 shown in FIG. 1) through the survey area whereby an imaging activation pattern (e.g., imaging activation pattern 202 shown in FIG. 3) and a velocity activation pattern (e.g., velocity activation pattern 220 shown in FIG. 3) are formed, wherein a lateral offset between the velocity activation pattern and the node patch is greater than a lateral offset between the imaging activation pattern and the node patch. In some embodiments, the node patch may be centrally positioned with respect to the imaging activation pattern and the velocity activation pattern. For example, in certain embodiments, the imaging activation pattern may be located directly above the node patch positioned on the seabed. In some embodiments, the velocity activation pattern comprises a plurality of separate velocity activation lines (e.g., velocity activation lines 224 shown in FIG. 3) separated by gaps (e.g., gaps 226 shown in FIG. 3). In certain embodiments, method 340 comprises correcting a seismic velocity model associated with the subterranean formation based on seismic data collected from the velocity activation pattern, and creating a seismic image of the subterranean formation based on seismic data collected from the imaging activation pattern and the corrected seismic velocity model.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for performing a seismic survey of an earthen subterranean formation, comprising:
   (a) deploying a node patch comprising a plurality of seismic receivers to an offshore seabed in a survey area whereby the node patch is positioned on the seabed, and wherein a water column extends from the seabed located at a bottom of the water column to a waterline located at a top of the water column;
   (b) performing a velocity survey having a velocity activation pattern extending in an inline direction and an orthogonal crossline direction, wherein (b) comprises:
      (b1) transporting an array of seismic sources for a first plurality of passes in the inline direction while repeatedly activating the array of seismic sources to generate seismic waves to define a first velocity activation line of the velocity survey containing a first plurality of velocity source points and forming a portion of the velocity activation pattern;
      (b2) transporting the array of seismic sources in the crossline direction across a predefined gap without activating the array of seismic sources whereby the gap does not contain any velocity source points;
      (b3) transporting, after traversing the gap, the array of seismic sources for a second plurality of passes in the inline direction while repeatedly activating the array of seismic sources to generate seismic waves to define a second velocity activation line of the velocity survey containing a second plurality of velocity source points and which is separated from the first velocity activation line in the crossline direction by the gap, wherein the second velocity activation line forms another portion of the velocity activation pattern; and
      (b4) repeating steps (b1), (b2), and (b3) to define a plurality of the first velocity activation lines, a plurality of the second velocity activation lines, and a plurality of the gaps whereby the plurality of second velocity activation lines are separated in the crossline direction from the plurality of first velocity activation lines by the plurality of gaps;
   (c) performing an imaging survey having an imaging activation pattern extending in the inline direction and the crossline direction and which overlies the velocity activation pattern of the velocity survey in a plan view, wherein (c) comprises:
      (c1) transporting the array of seismic sources through the survey area while repeatedly activating the array of seismic sources to generate seismic waves to form a plurality of imaging source points forming the imaging activation pattern defining an outer periphery within which each of the plurality of imaging source points are located.

2. The method of claim 1, wherein both the first velocity activation line and the second velocity activation line has a minimum crossline width of at least 400 meters.

3. The method of claim 1, wherein both the first velocity activation line and the second velocity activation line has a minimum crossline width of at least 500 meters.

4. The method of claim 1, wherein a ratio of an average crossline width of both the first velocity activation line and the second velocity activation line to an average crossline width of the gap is between 0.10 and 0.40.

5. The method of claim 1, wherein each of the seismic sources comprises a seismic airgun.

6. The method of claim 1, wherein an activation density of both the first velocity activation line and the second velocity activation line is greater than an activation density of the imaging activation pattern.

7. The method of claim 1, further comprising:

(d) correcting a seismic velocity model associated with the subterranean formation based on seismic data collected from the velocity activation pattern; and (e) creating a seismic image of the subterranean formation based on seismic data collected from the imaging activation pattern and the seismic velocity model corrected at (d).

8. A method for performing a seismic survey of an earthen subterranean formation, comprising:

(a) deploying a node patch comprising a plurality of seismic receivers to an offshore seabed in a survey area whereby the node patch is positioned on the seabed, and wherein a water column extends from the seabed located at a bottom of the water column to a waterline located at a top of the water column;

(b) performing a velocity survey having a velocity activation pattern extending in an inline direction and an orthogonal crossline direction, wherein (b) comprises:

(b1) transporting an array of seismic sources for a first plurality of passes in the inline direction while repeatedly activating the array of seismic sources to generate seismic waves to define a first velocity activation line of the velocity survey containing a first plurality of velocity source points and forming a portion of the velocity activation pattern, wherein the array of seismic sources, upon activation, is configured to produce a combined average amplitude of less than 200 decibels (dB), integrated over about 10 seconds, at frequencies less than 1.7 Hertz (Hz);

(b2) transporting the array of seismic sources in the crossline direction across a predefined gap without activating the array of seismic sources whereby the gap does not contain any velocity source points;

(b3) transporting, after traversing the gap, the array of seismic sources for a second plurality of passes in the inline direction while repeatedly activating the array of seismic sources to generate seismic waves to define a second velocity activation line of the velocity survey containing a second plurality of velocity source points and which is separated from the first velocity activation line in the crossline direction by the gap, wherein the second velocity activation line forms another portion of the velocity activation pattern; and (b4) repeating steps (b1), (b2), and (b3) to define a plurality of the first velocity activation lines, a plurality of the second velocity activation lines, and a plurality of the gaps whereby the plurality of second velocity activation lines are separated in the crossline direction from the plurality of first velocity activation lines by the plurality of gaps;

(c) performing an imaging survey having an imaging activation pattern extending in the inline direction and the crossline direction and which overlies the velocity activation pattern of the velocity survey in a plan view, wherein (c) comprises:

(c1) transporting the array of seismic sources through the survey area while repeatedly activating the array of seismic sources to generate seismic waves to form a plurality of imaging source points forming the imaging activation pattern defining an outer periphery within which each of the plurality of imaging source points are located.

9. The method of claim 8, wherein both the first velocity activation line and the second velocity activation line has a minimum crossline width of at least 400 meters.

10. The method of claim 8, wherein both the first velocity activation line and the second velocity activation line has a minimum crossline width of at least 500 meters.

11. The method of claim 8, wherein a ratio of an average crossline width of both the first velocity activation line and the second velocity activation line to an average crossline width of the gap is between 0.10 and 0.40.

12. The method of claim 8, wherein each of the seismic sources comprises a seismic airgun.

13. The method of claim 8, wherein an activation density of both the first velocity activation line and the second velocity activation line is greater than an activation density of the imaging activation pattern.

14. The method of claim 8, further comprising:

(d) correcting a seismic velocity model associated with the subterranean formation based on seismic data collected from the velocity activation pattern; and (e) creating a seismic image of the subterranean formation based on seismic data collected from the imaging activation pattern and the seismic velocity model corrected at (d).

15. A method for performing a seismic survey of an earthen subterranean formation, comprising:

(a) deploying a node patch comprising a plurality of seismic receivers to an offshore seabed in a survey area whereby the node patch is positioned on the seabed, and wherein a water column extends from the seabed located at a bottom of the water column to a waterline located at a top of the water column;

(b) performing a velocity survey having a velocity activation pattern extending in an inline direction and an orthogonal crossline direction, wherein (b) comprises:

(b1) transporting an array of seismic sources for a first plurality of passes in the inline direction while repeatedly activating the array of seismic sources to generate seismic waves to define a first velocity activation line of the velocity survey containing a first plurality of velocity source points and forming a portion of the velocity activation pattern;

(b2) transporting the array of seismic sources in the crossline direction across a predefined gap without activating the array of seismic sources whereby the gap does not contain any velocity source points;

(b3) transporting, after traversing the gap, the array of seismic sources for a second plurality of passes in the inline direction while repeatedly activating the array of seismic sources to generate seismic waves to define a second velocity activation line of the velocity survey containing a second plurality of velocity source points and which is separated from the first velocity activation line in the crossline direction by the gap, wherein the second velocity activation line forms another portion of the velocity activation pattern; and (b4) repeating steps (b1), (b2), and (b3) to define a plurality of the first velocity activation lines, a plurality of the second velocity activation lines, and a plurality of the gaps whereby the plurality of second velocity activation lines are separated in the crossline direction from the plurality of first velocity activation lines by the plurality of gaps;

(c) performing an imaging survey having an imaging activation pattern extending in the inline direction and the crossline direction and which overlies the velocity activation pattern of the velocity survey in a plan view whereby a lateral offset between the velocity activation pattern and the node patch is greater than a lateral offset between the imaging activation pattern and the node patch, and wherein (c) comprises:

(c1) transporting the array of seismic sources through the survey area while repeatedly activating the array of seismic sources to generate seismic waves to form a plurality of imaging source points forming the imaging activation pattern defining an outer periphery within which each of the plurality of imaging source points are located.

16. The method of claim 15, wherein both the first velocity activation line and the second velocity activation line has a minimum crossline width of at least 400 meters.

17. The method of claim 15, wherein a ratio of an average crossline width of both the first velocity activation line and the second velocity activation line to an average crossline width of the gap is between 0.10 and 0.40.

18. The method of claim 15, wherein each of the seismic sources comprises a seismic airgun.

19. The method of claim 15, further comprising:

(d) correcting a seismic velocity model associated with the subterranean formation based on seismic data collected from the velocity activation pattern; and (e) creating a seismic image of the subterranean formation based on seismic data collected from the imaging activation pattern and the seismic velocity model corrected at (d).

\* \* \* \* \*